United States Patent
Sundaram et al.

(10) Patent No.: US 9,102,530 B2
(45) Date of Patent: Aug. 11, 2015

(54) HYDROGEN PRODUCTION WITH CARBON CAPTURE

(71) Applicants: Narasimhan Sundaram, Annandale, VA (US); John W. Viets, Fairfax, VA (US)

(72) Inventors: Narasimhan Sundaram, Annandale, VA (US); John W. Viets, Fairfax, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 181 days.

(21) Appl. No.: 14/020,073

(22) Filed: Sep. 6, 2013

(65) Prior Publication Data

US 2014/0010753 A1 Jan. 9, 2014

Related U.S. Application Data

(62) Division of application No. 13/468,300, filed on May 10, 2012, now Pat. No. 8,557,218.

(60) Provisional application No. 61/485,325, filed on May 12, 2011.

(51) Int. Cl.
*C01B 3/22* (2006.01)
*C01B 3/32* (2006.01)
(Continued)

(52) U.S. Cl.
CPC .............. *C01B 3/22* (2013.01); *B01D 53/0473* (2013.01); *B01D 53/1475* (2013.01); *B01D 53/75* (2013.01); *C01B 3/32* (2013.01); *C01B 3/48* (2013.01); *C01B 3/52* (2013.01); *C01B 3/56* (2013.01); *C01B 31/20* (2013.01); *B01D 2252/20447* (2013.01); *B01D 2252/20484* (2013.01); *B01D 2253/102* (2013.01); *B01D 2253/104* (2013.01); *B01D 2253/108* (2013.01);
(Continued)

(58) Field of Classification Search
None
See application file for complete search history.

(56) References Cited

U.S. PATENT DOCUMENTS 7,632,476 B2    12/2009    Shah et al.
2009/0117024 A1    5/2009    Weedon et al.
(Continued)

FOREIGN PATENT DOCUMENTS

EP    1146009 A1    10/2001
EP    2141119 A1    6/2010

OTHER PUBLICATIONS

The International Search Report and Written Opinion of PCT/US2012/037416.
(Continued)

*Primary Examiner* — Melvin C Mayes
*Assistant Examiner* — Douglas Call
(74) *Attorney, Agent, or Firm* — Larry E. Carter; Bruce M. Boredelon; Chad A. Guice

(57) ABSTRACT

Systems and methods for hydrogen production with carbon capture are provided. A hydrogen containing stream can be divided so that a portion of the stream is processed for separation of $CO_2$. A hydrogen enriched stream formed during separation of $CO_2$ and another portion of the hydrogen containing stream can be processed in a cycling adsorber unit to form a hydrogen product stream. Optionally, the cycling adsorber unit can be operated to form a plurality of tail gas streams. The hydrogen containing stream can be a reformed hydrocarbon stream and/or an input stream previously exposed to a water gas shift catalyst. Optionally, a portion of the reformed hydrocarbon stream can be a reformed biocomponent stream.

6 Claims, 2 Drawing Sheets

(51) Int. Cl.
*C01B 3/48* (2006.01)
*C01B 3/52* (2006.01)
*C01B 3/56* (2006.01)
*C01B 31/20* (2006.01)
*B01D 53/047* (2006.01)
*B01D 53/14* (2006.01)
*B01D 53/75* (2006.01)

(52) U.S. Cl.
CPC ......... *B01D 2253/25* (2013.01); *B01D 2256/16* (2013.01); *B01D 2257/502* (2013.01); *B01D 2257/504* (2013.01); *B01D 2257/7025* (2013.01); *B01D 2259/4141* (2013.01); *C01B 2203/0233* (2013.01); *C01B 2203/0283* (2013.01); *C01B 2203/043* (2013.01); *C01B 2203/0415* (2013.01); *C01B 2203/0811* (2013.01); *C01B 2203/1041* (2013.01); *C01B 2203/1211* (2013.01); *C01B 2203/1235* (2013.01); *C01B 2203/1264* (2013.01); *C01B 2203/145* (2013.01); *C01B 2203/86* (2013.01); *Y02C 10/06* (2013.01); *Y02C 10/08* (2013.01); *Y02C 20/20* (2013.01)

(56) References Cited

U.S. PATENT DOCUMENTS

2010/0037521 A1 2/2010 Vakil et al.
2011/0011128 A1 1/2011 Grover

OTHER PUBLICATIONS

Ian Lindsay et al., "Designing a climate friendly hydrogen plant," Energy Procedia, 2009, pp. 4095-4102, vol. 1.

HYDROGEN PRODUCTION WITH CARBON CAPTURE

CROSS-REFERENCE TO RELATED APPLICATIONS

This application is a divisional application of U.S. Ser. No. 13/468,300, filed May 10, 2012 now U.S. Pat. No. 8,557,218, which claims priority to U.S. Ser. No. 61/485,325, filed May 12, 2011, which are both herein incorporated by reference in their entirety.

FIELD OF THE INVENTION

Systems and methods are provided relating to hydrogen production, in many cases combined with capture/sequestration of carbon-containing molecules, such as in a refinery setting.

BACKGROUND OF THE INVENTION

Hydrogen is an important resource in the refining of crude oils and other hydrocarbon fractions. Refinery processes, such as hydrotreatment, hydrocracking, and catalytic dewaxing, can be dependent on the availability of hydrogen at a sufficiently high pressure as well as a sufficiently high purity.

Unfortunately, refineries tend to be net consumers of hydrogen. While processes such as reforming can result in generation of additional hydrogen, a typical refinery has greater demand for hydrogen than is available from processes in the refinery that generate hydrogen. External sources of hydrogen can be brought in to a refinery to make up the shortfall. However, such external hydrogen represents an additional (and potentially substantial) refinery cost, so any savings in the amount of external hydrogen consumed is beneficial.

One potential way to reduce the amount of external hydrogen needed can be to improve the use and recovery of hydrogen within a refinery. Refinery processes are typically performed using an excess of hydrogen, so that some hydrogen remains as an effluent or other product that exits a reactor. However, this hydrogen will typically have a higher level of impurities. Purifying and/or pressurizing this recycled hydrogen for use in the refinery can result in significant costs.

U.S. Pat. No. 7,632,476 describes a method for recovering carbon dioxide from a synthesis gas stream. Synthesis gas can be formed in a synthesis gas reactor, such as a steam reformer. A water gas shift reaction can be used to increase the amount of hydrogen in the synthesis gas. $CO_2$ can be adsorbed from the output gas from the water gas shift reactor using an adsorbent system, such as an amine adsorbent system. After $CO_2$ removal, hydrogen can be extracted from the output gas using a pressure swing adsorption system. Optionally, only a portion of the output from the water gas shift reaction can be diverted to the $CO_2$ adsorbent system.

U.S. Patent Application Publication No. 2009/0117024 describes a process for hydrogen production with co-production and capture of carbon dioxide. A hydrocarbon reforming process can be used to generate a reformed gas stream. The hydrogen in a reformed gas stream can be removed first, such as by using a pressure swing adsorption unit. Carbon dioxide can then be separated from the hydrogen-depleted stream from the pressure swing adsorption unit.

U.S. Patent Application Publication No. 2010/0037521 describes another process for hydrogen and carbon dioxide production. A modified hydrocarbon reforming process is described that can increase the relative amount of $CO_2$ in a high pressure syngas product relative to a lower pressure flue gas generated by the reforming process. The high pressure syngas product can then be sequentially passed through a $CO_2$ recovery unit and a pressure swing adsorption unit for hydrogen recovery.

U.S. Patent Application Publication No. 2011/0011128 describes another process for hydrogen and carbon dioxide production. A hydrocarbon reforming process can be used to generate a stream containing hydrogen. The output from reforming can optionally be exposed to steam and a water shift catalyst to increase the hydrogen and carbon dioxide content of the stream. Hydrogen can then be separated from the stream using a pressure swing adsorption process. The system for the pressure swing adsorber can include multiple beds, with a conduit between beds. The multiple beds can optionally include different types of adsorbent material. For example, one bed can favor adsorption of carbon dioxide while a second bed can favor adsorption of methane. During the purge portion of the cycle of the pressure swing adsorber, the purge streams from the multiple beds can be separated, such as by withdrawing one of the purge streams via the conduit between the beds. The purge stream from the bed with greater methane adsorption can then be recycled as an input for the hydrocarbon reforming.

SUMMARY OF THE INVENTION

In a first aspect, a method for recovery of hydrogen and carbon dioxide in a refinery is provided. The method can include dividing an input stream containing hydrogen, carbon dioxide, and a hydrocarbon into a first input portion and a second input portion, the input stream comprising an effluent from a reforming unit, the input stream exhibiting a hydrogen content of at least about 70 vol % and a $CO_2$ content of at least about 5 vol %, the first input portion comprising from about 5 vol % to about 60 vol % of the input stream; combining the first input portion and a first tail gas stream, the combined first input portion and first tail gas stream exhibiting a $CO_2$ content of less than about 70 vol %; separating the first input portion and a first tail gas stream to form a $CO_2$ recovery stream and a hydrogen enriched stream, the $CO_2$ recovery stream having a $CO_2$ content of at least about 70 vol %, the $CO_2$ recovery stream containing at least about 80% of the $CO_2$ in the combined first input portion and first tail gas stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 90 vol %, the hydrogen product stream containing at least about 85% of the $H_2$ in the input stream; contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 60% by volume on a dry basis and a first hydrocarbon content of about 10% or less by volume on a dry basis; contacting the adsorbent with a second regeneration stream at a second pressure of about 5 psig (about 35 kPag) to about 20 psig (about 140 kPag) to form a second tail gas stream, the second tail gas stream containing a second combined content of CO plus $CO_2$ of about 10% or less by volume on a dry basis and a second hydrocarbon content of at least about 40% by volume on a dry basis, the second tail gas stream comprising from about 25% to about 60% of a combined volume of the first and second tail gas streams; and introducing the second tail gas stream as an input to the reforming unit.

In a second aspect, a method for recovery of hydrogen and carbon dioxide in a refinery is provided. The method can include dividing an input stream containing hydrogen, carbon dioxide, and a hydrocarbon into a first input portion and a second input portion, the input stream comprising an effluent from a reforming unit, the input stream exhibiting a hydrogen content from about 40 vol % of $H_2$ to about 70 vol % and a $CO_2$ content of at least about 25 vol %, the first input portion comprising from about 5 vol % to about 60 vol % of the input stream; combining the first input portion and a first tail gas stream, the combined first input portion and first tail gas stream having a $CO_2$ content of less than about 70 vol %; separating the first input portion and a first tail gas stream to form a $CO_2$ recovery stream and a hydrogen enriched stream, the $CO_2$ recovery stream having a $CO_2$ content of at least about 70 vol %, the $CO_2$ recovery stream containing at least about 80% of the $CO_2$ in the combined first input portion and first tail gas stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 90 vol %, the hydrogen product stream containing at least about 85% of the $H_2$ in the input stream; contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50% by volume on a dry basis and a first hydrocarbon content of about 10% or less by volume on a dry basis; contacting the adsorbent with a second regeneration stream at a second pressure from about 5 psig (about 35 kPag) to about 20 psig (about 140 kPag) to form a second tail gas stream, the second tail gas stream containing a second combined content of CO plus $CO_2$ of about 10% or less by volume on a dry basis and a second hydrocarbon content of at least about 50% by volume on a dry basis, the second tail gas stream comprising from about 5% to about 25% of a combined volume of the first and second tail gas streams; and introducing the second tail gas stream as an input to the reforming unit.

In still another aspect, a method for recovery of hydrogen and carbon dioxide in a refinery is provided. The method can include exposing a feed including at least a biocomponent portion to a hydroprocessing catalyst under effective conditions to produce a deoxygenated biocomponent input stream, said exposing being an exothermic reaction that generates heat; reforming the deoxygenated biocomponent input stream to form an effluent containing hydrogen, carbon dioxide, and a hydrocarbon, the reforming comprising contacting the deoxygenated biocomponent input stream with a first stream containing water vapor in the presence of a reforming catalyst; contacting the reforming effluent with a water gas shift catalyst in the presence of a second stream containing water vapor under effective conditions to form a shifted reforming effluent, containing a hydrogen content of about 70 vol % and a $CO_2$ content of at least about 5 vol %; absorbing at least a portion of the heat generated by said exposing, the heat being absorbed by at least one of the first stream containing water vapor, the second stream containing water vapor, or an input stream to said reforming; dividing the reforming effluent into a first input portion and a second input portion, the first input portion comprising from about 5 vol % to about 60 vol % of the reforming effluent; treating the first input portion with an amine under effective conditions for separation of $CO_2$ to form a $CO_2$ recovery stream having a $CO_2$ content of at least about 70 vol % and a hydrogen enriched stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 99.0% by volume and a pressure of at least about 90% of the pressure of the input stream; optionally contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50% by volume on a dry basis and a first hydrocarbon content of about 10% or less by volume on a dry basis; optionally contacting the adsorbent with a second regeneration stream at a second pressure of about 5 psig (about 35 kPag) to about 20 psig (about 140 kPag) to form a second tail gas stream, the second tail gas stream containing a second combined content of CO plus $CO_2$ of about 10% or less by volume on a dry basis and a second hydrocarbon content of at least about 50% by volume on a dry basis, the second tail gas stream comprising from about 5% to about 25% of a combined volume of the first and second tail gas streams; and optionally introducing the second tail gas stream as an input to the reforming unit.

DETAILED DESCRIPTION OF THE EMBODIMENTS

Overview

Figure 1:
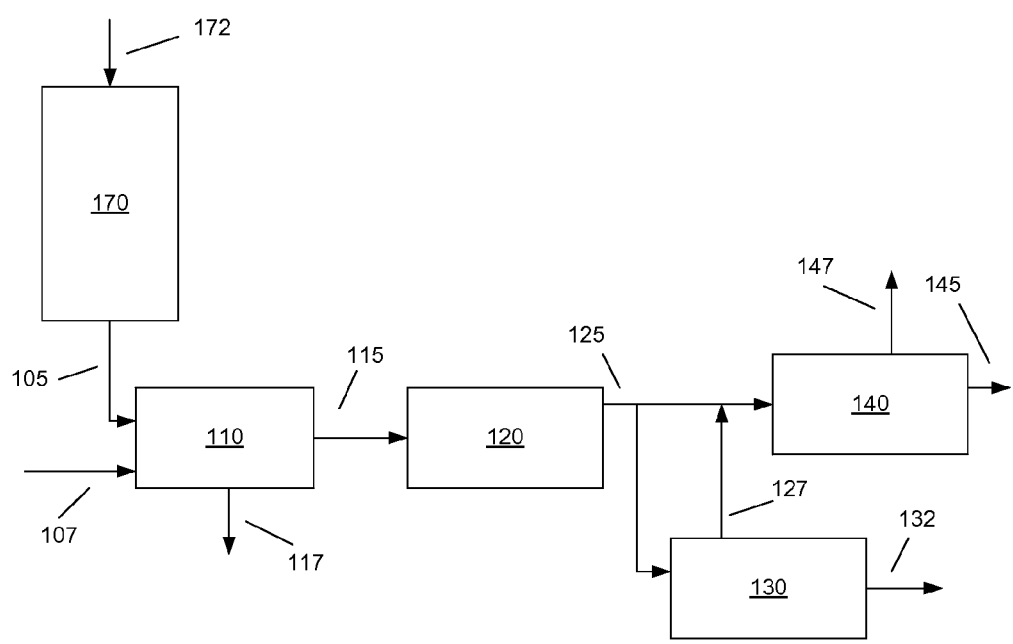
FIG. 1 schematically shows an example of a system for producing hydrogen.

Hydrocarbon reforming reactions can provide a valuable source of hydrogen within a refinery setting. Unfortunately, reforming of hydrocarbons can also typically lead to production of carbon oxides. The amount of carbon monoxide produced can be mitigated by using a water gas shift reactor to convert carbon monoxide and water to hydrogen and carbon dioxide. However, this can still result in production of additional carbon dioxide.

Due to increased regulation of greenhouse gases, it can be desirable to capture sources of $CO_2$ within a refinery. One difficulty in capturing $CO_2$ from a hydrogen generation process can be balancing the desire to capture an increasing amount of $H_2$ with the desire to capture an increasing amount of $CO_2$. Using conventional techniques, using a swing adsorber such as a pressure swing adsorber (PSA) can be beneficial for increasing the amount and purity of hydrogen from the hydrogen generation process. For $CO_2$, an amine wash can provide an option for increased carbon capture. Unfortunately, sequential processing of the output from a hydrogen generation plant can typically result in lower capture rates for hydrogen and/or carbon oxides, depending on the order of the capture steps.

In various embodiments, systems and methods are provided for recovery of hydrogen and carbon dioxide from a hydrogen generation process. This can include using biocomponent based hydrocarbons for the hydrocarbon reforming. Additionally or alternately, the carbon dioxide formed during hydrogen generation can be recovered in a manner that improves the capture of both carbon dioxide and hydrogen. Further additionally or alternately, the systems and methods can allow more than one flue gas to be derived from the hydrogen capture process. This can allow a methane- (and/or other hydrocarbon-) rich part of the flue gas to be used as a fuel for the hydrocarbon reforming, while still allowing for improved capture of carbon dioxide.

One option for improving the recovery of both hydrogen and carbon dioxide can be to avoid sequential processing of the entire effluent from the reforming and/or water gas shift reaction. Conventionally, the effluent form hydrocarbon reforming can be passed to either a $CO_2$ recovery process or an $H_2$ recovery process. If desired, an output from the $CO_2$ (or $H_2$) recovery process can then be passed to a process for recovery of $H_2$ (or $CO_2$). By contrast, it has been unexpectedly discovered that performing an initial $CO_2$ recovery on only a portion of the effluent can lead to an increase in recovery for $H_2$ and/or $CO_2$.

Additionally or alternately, the amount of carbon oxides generated by a hydrocarbon reforming process can be reduced by reducing the overall fuel requirement for reforming. This can be achieved, in part, by using oxygen-containing compounds, such as fatty acid alkyl esters, as a hydrocarbon input for reforming. Conventionally, reforming of hydrocarbons to generate hydrogen and carbon monoxide is an endothermic process. As a result, in addition to the hydrocarbons needed for generation of the hydrogen and carbon monoxide, additional hydrocarbon material is typically combusted to provide the heat necessary to drive the endothermic reforming reaction. Prior to reforming, a biocomponent based hydrocarbon feed can be hydroprocessed. In addition to converting the oxygen-containing compound(s) (e.g., fatty acid alkyl ester(s)) to a combination of hydrocarbons, carbon oxides, and water, the hydroprocessing reaction can be exothermic. The heat from the hydroprocessing reaction can be used to provide a portion of the heat for the reforming process.

Further additionally or alternately, advantages can be provided by operating a hydrogen capture portion of hydrogen generation process to allow for generation of more than one flue gas. Conventionally, a pressure swing adsorption process can include several stages. In a first, higher pressure stage, a hydrogen-containing stream can be passed into a chamber that contains an adsorbent material. The adsorbent material can be suitable for adsorption of contaminants in the hydrogen-containing stream, such as CO, $CO_2$, and/or $CH_4$. In a second stage, the pressure can be reduced while hydrogen (or another purge gas) is passed through the chamber in order to desorb the contaminants. This can result in a flue gas containing the various contaminants adsorbed during the first stage. This process can then be cyclically repeated, as a later stage can regenerate the adsorbent capabilities of the chamber.

Instead of generating a single contaminant flue gas, an alternative way to operate the chamber can be to split the second stage into two or more parts. For example, the pressure in the chamber can be lowered to a first level to allow for desorption of a first type of contaminant that may be less strongly bound to the adsorbent. After flushing the majority of the first contaminant, in such a situation, the pressure can be dropped again to release the remaining contaminant(s). This can lead to generation of two (or more) flue gases with different compositions. Based on the different compositions, the flue gases can be used for different purposes. For example, a methane rich flue gas can be recycled to the hydrocarbon reforming process as a fuel while a carbon dioxide rich flue gas can be directed to a $CO_2$ recovery process.

Hydrocarbon Reforming for Hydrogen Production

In various embodiments, a hydrocarbon reformer can be used to generate a stream containing at least hydrogen and carbon oxides. Any suitable type(s) of reforming unit can be used, such as a steam reforming unit and/or an autothermal reforming unit. Optionally, a water gas shift reactor can additionally be used to increase the amount of hydrogen and carbon dioxide in the output stream.

As an example, a steam reforming unit can be used to generate an output stream containing at least hydrogen and carbon oxides. A steam reforming unit can be any conventional reforming apparatus wherein a gaseous hydrocarbon feedstream can be contacted and reacted with steam in order to produce syngas containing $H_2$, CO, and $CO_2$. The hydrocarbon/steam reaction can generally be conducted in the presence of a catalyst. The basic reaction in steam reforming is a reaction of a hydrocarbon (such as methane) with water to form carbon monoxide.

$$CH_4 + H_2O \Longleftrightarrow 3H_2 + CO \quad (1)$$

Reaction (1) is generally reversible and endothermic, requiring addition of heat to a reforming unit to maintain the conditions for generation of hydrogen. Depending on the reaction conditions and/or the presence of other species in the reforming unit, carbon dioxide can also be produced during a reforming process.

Any conventional reforming type catalyst can be used in a steam reforming unit. The catalyst used in the step of catalytic steam reforming can generally include at least one active transition metal (e.g., in the form of a transition metal oxide) of Groups 6 and 8-10 of the Periodic Table of the Elements. Typical examples of reforming catalysts that can be used can include, but are not limited to, nickel, nickel oxides, cobalt oxides, chromium oxides, and molybdenum oxides. Optionally, the catalyst can include at least one promoter, such as an alkali and/or rare earth metal promoter. Optionally, the catalyst can include one or more metals to suppress carbon deposition during steam reforming, such as germanium, tin, lead, arsenic, antimony, and bismuth. Additionally or alternately, the catalyst may include one or more platinum group metals (e.g., platinum and/or palladium), which are capable of increasing the activity of the non-noble catalytic materials such as nickel or cobalt, and/or are capable of decreasing the tendency to carbon lay-down or coking when reacting steam with hydrocarbons higher than methane.

In one embodiment, the steam reforming unit can include tubes which are packed with solid catalyst granules. The solid catalyst granules can comprise nickel or other catalytic agents deposited on a suitable inert carrier material, such as an NiO catalyst supported on calcium aluminate, alumina, spinel type magnesium aluminum oxide, calcium aluminate titanate, or the like. In an embodiment, a hydrocarbon feed can be passed to a tubular reformer together with steam, and the hydrocarbon and steam can contact a steam reforming catalyst. The steam reforming catalyst can be disposed in a plurality of furnace tubes that are optionally maintained at an elevated temperature by radiant heat transfer and/or by contact with combustion gases. Fuel, such as a portion of the hydrocarbon feed, can be burned in a reformer furnace to externally heat the reformer tubes therein.

Additionally or alternately, both the hydrocarbon feed stream and the steam can be preheated prior to entering the steam reformer. The hydrocarbon feedstock can be preheated up to as high a temperature as is consistent with reducing or avoiding undesired pyrolysis or other heat deterioration. Since steam reforming is typically endothermic in nature, and since there are practical limits to the amount of heat that can be added by indirect heating in the reforming zones, preheating of the feed can be desirable to facilitate the attainment and maintenance of a suitable temperature within the reformer itself. Accordingly, the hydrocarbon feed and/or the steam can be preheated to a temperature of at least about 200° C., for example at least about 400° C. The steam reforming reaction can be carried out such that the exit temperature of effluent from the steam reformer can be at least about 500° C., for example at least about 750° C. or at least about 800° C. Additionally or alternately, the exit temperature of effluent from the steam reformer can be about 1,000° C. or less, for example about 950° C. or less or about 900° C. or less. Steam reforming can be carried out at superatmospheric pressures, such as at a pressure of at least about 10 barg (about 1 MPag) or at least about 20 barg (about 2 MPag). Further additionally or alternately, the steam reforming can be carried out at a pressure of about 30 barg (about 3 MPag) or less, for example about 25 barg (about 2.5 MPag) or less.

The effluent from hydrocarbon reforming can optionally be modified by exposing the effluent to a water gas shift catalyst under effective conditions. The water gas shift process is a conventional reaction for converting carbon monoxide and water to hydrogen and carbon dioxide.

$$H_2O + CO \Longleftrightarrow H_2 + CO_2 \qquad (2)$$

A water gas shift reaction can typically be performed in the presence of a catalyst, such as an iron oxide, a combination of zinc oxide and aluminum oxide, or one or more transition metal oxides. A range of temperatures can be used for a water gas shift reaction, although the range can typically be below the exit temperature of a hydrocarbon reforming process. Depending on the type of catalyst, the temperature for the water gas shift reaction can be from about 190° C. to about 350° C. The reaction is generally exothermic, so increasing temperatures can tend to favor production of CO and $H_2O$. When used on the effluent from a hydrocarbon reforming unit, the reaction can be driven toward production of additional hydrogen by introducing an excess of steam into the water gas shift reaction.

In some embodiments, the output from the reforming unit and/or the water gas shift process can have a $H_2$ content of at least about 60 vol %, for example at least about 70 vol % or at least about 80 vol %. In other embodiments, the output from the reforming unit and/or the water gas shift process can have a hydrogen content of at least about 35 vol %, for example at least about 40 vol % or at least about 50 vol %, and a hydrogen content of about 75 vol % or less, for example about 70 vol % or less or about 60 vol % or less. Additionally or alternately, the output from the reforming unit and/or the water gas shift process can have a $CO_2$ content of at least about 5 vol %, for example at least about 10 vol %, at least about 20 vol %, at least about 25 vol %, or at least about 30 vol %.

Recovery of Carbon Dioxide

A variety of techniques are available for recovering $CO_2$ from a gas phase effluent, such as the product from a hydrocarbon reforming unit. One option for recovering $CO_2$ can involve passing the effluent through an absorbent system, such as an amine absorbent system. Suitable amines can include piperazines and/or ethanolamines. Various known/conventional methods for using amines to extract $CO_2$ can be used in conjunction with the inventive systems and methods described herein.

One example of a system for recovering $CO_2$ from a gas phase effluent can be to use a pair of columns. A first column can be set up for effective contacting of a gas phase effluent with a solvent/absorbent for the $CO_2$. The gas phase effluent can advantageously be passed through the column in a counter-current manner relative to the $CO_2$ absorbent. The output from the first column can thus be a gas phase product with a reduced $CO_2$ content and typically a liquid absorbent with an increased $CO_2$ content. Optionally, the column can include contacting elements to increase the interaction between the gas flow and the liquid absorbent within the column. The contacting elements can be, for example, trays or packing material. Optionally, a wash region can be included at the top of the column to remove any absorbent that becomes entrained in the gas phase flow.

The second column can advantageously be used to regenerate the absorbent, resulting in a product stream containing at least the extracted $CO_2$. In the second column, the liquid absorbent containing the $CO_2$ can be passed down through the second column. The second column may also contain contacting elements. The pressure in the second column can be lower than the first column, resulting in some release of the $CO_2$ due the lower pressure. $CO_2$ remaining in the absorbent at the bottom of the column can be removed by heating the absorbent. This can result in action similar to a distillation column, where the absorbent and $CO_2$ can form a vapor that can travel up in the column. As the vapor cools, the absorbent can fall back down in the column as a liquid, leaving behind the gas phase $CO_2$. A $CO_2$ stream can be removed from the top of the second column.

By using an amine unit (or another type of $CO_2$ recovery process), an input stream having a $CO_2$ content can be separated to form a $CO_2$ recovery stream and a stream containing a reduced amount of $CO_2$. When the input stream corresponds to the output from a reforming unit and/or a water gas shift reactor, the stream containing the reduced amount of $CO_2$ can correspond to a hydrogen enriched stream. Optionally, the input stream to a $CO_2$ recovery process can also include a portion of a tail gas from a hydrogen purification process, such as a hydrogen purification process in a cycling adsorber unit. The input stream to the $CO_2$ recovery process can have an input $CO_2$ content of about 75 vol % or less, for example about 70 vol % or less, about 65% or less, or about 60 vol % or less. Additionally or alternately, the input stream to the $CO_2$ recovery process can have a $CO_2$ content of at least about 50 vol %, for example at least about 60 vol % or at least about 65 vol %. Relative to the input stream, the (output) $CO_2$ recovery stream can include at least about 65% of the $CO_2$ content from the input stream, for example at least about 70%, at least about 75%, at least about 80%, or at least about 85%. Preferably, the percentage of $CO_2$ by volume in the $CO_2$ recovery stream can be greater than the net percentage of $CO_2$ by volume of the input streams to the $CO_2$ recovery process.

Pressure Swing Adsorption for Hydrogen Purification

One option for removing contaminants from a hydrogen stream can be by using a cycling adsorber, such as a pressure swing adsorber unit and/or a temperature swing adsorber unit. In a pressure swing adsorption (PSA) embodiment, a gaseous mixture can be conducted under pressure for a period of time over a first bed of a solid sorbent. The sorbent can advantageously be selective (or at least relatively selective) for one or more components to be removed, usually regarded as contaminants in the gas stream. Alternately, the sorbent may be (relatively) selective for one or more components desired to be isolated and kept, not removed as contaminant(s). The skilled person should understand how to modify the disclosure herein to adjust for isolation of one or more desired compounds, as opposed to one or more contaminants (as presented below).

In an embodiment, a pressure swing cycle can include a feed step, at least one depressurization step, a purge step, and a repressurization step to prepare the adsorbent material for reintroduction of the feed. The sorption of the contaminant(s) can usually take place by physical adsorption, though (relatively) easily reversible chemical adsorption/absorption can be alternately contemplated. The sorbent can typically comprise (or consist essentially of) a porous solid such as activated carbon, alumina, silica, silica-alumina, or the like, that has an affinity for the contaminant. Zeolites can additionally or alternatively be used in many applications, since they may exhibit a significant degree of selectivity for certain contaminants, by virtue of their controlled/predictable pore sizes. Normally, chemical reaction with the sorbent is not favored, in view of the increased difficulty of achieving desorption of species that have become chemically bound to the sorbent. However, chemisorption of a contaminant can result if the adsorbed material(s) may be effectively desorbed during the desorption portion of the cycle, e.g., by the use of higher temperatures coupled with the reduction in pressure.

In typical operation, a gaseous mixture can be passed over a first adsorption bed in a first vessel. The gaseous mixture can emerge from the bed depleted in the contaminant that remains adsorbed in/by the bed. This gaseous mixture can advantageously correspond to the desired product stream, such as a hydrogen product stream, but, in other embodiments, it can correspond to the contaminant stream to be separated from the desired component(s) that are adsorbed, with understandable manipulation of the following disclosure. After a predetermined time or, alternately when a break-through of the contaminant is observed, the flow of the gaseous mixture can be switched to a second adsorption bed in a second vessel for the purification to continue. While the second bed is in adsorption service, the adsorbed contaminant can be removed from the first adsorption bed, e.g., by a reduction in pressure, usually accompanied by a reverse flow of a regeneration gas stream to desorb the contaminant. Any convenient regeneration gas stream can be used, such as an inert gas stream and/or a hydrogen gas stream (particularly in embodiments where hydrogen is the desired adsorbed component). As the pressure in the vessels is reduced, the contaminant previously adsorbed on the bed can progressively be desorbed and can exit the cycling adsorber unit as a tail gas. The tail gas can be received by a tail gas system, such as a system including a tail gas drum and a control system designed to minimize pressure fluctuations to downstream systems. The contaminant can be collected from the tail gas system in any suitable manner and can be processed further or disposed of, as appropriate. In typical operation, when desorption is (substantially) complete, the sorbent bed may be purged with an inert gas stream.

In typical operation, after breakthrough in the second (or a later) bed, and after the first bed has been regenerated so that it is again prepared for adsorption service, the flow of the gaseous mixture can be switched from the second (or later) bed back to the first bed, and regeneration can begin on the second (or later) bed. The total cycle time is the length of time from when the gaseous mixture is first conducted to the first bed in a first cycle to the time when the gaseous mixture is first conducted to the first bed in the immediately succeeding cycle, i.e., after a single regeneration of the first bed. The use of third, fourth, fifth, etc. vessels in addition to the second vessel, as might be needed when adsorption time is relatively short but desorption time is relatively long, can serve to increase the total cycle time.

In an embodiment, the input stream to a cycling adsorber unit for hydrogen recovery can have a total pressure of at least about 145 psig (about 1.0 MPag), for example at least about 250 psig (about 1.7 MPag), at least about 360 psig (about 2.5 MPag), at least about 580 psig (about 4.0 MPag), at least about 870 psig (about 6.0 MPag), or at least about 1160 psig (about 8.0 MPag). Additionally or alternately, the input stream to a cycling adsorber unit can have a total pressure of about 1800 psig (about 12.4 MPag) or less, for example about 1450 psig (about 10.0 MPag) or less, about 1160 psig (about 8.0 MPag) or less, about 870 psig (about 6.0 MPag) or less, or about 580 psig (about 4.0 MPag) or less.

During typical operation of a cycling adsorber unit, a purge stream can also be used during a portion of the operation cycle. The pressure of the purge stream delivered to the cycling adsorber unit can be about 145 psig (about 1.0 MPag) or less, for example about 125 psig (about 860 kPag) or less, about 100 psig (about 690 kPag) or less, about 75 psig (about 520 kPag) or less, about 60 psig (about 410 kPag) or less, or about 45 psig (about 310 kPag) or less.

A cycling adsorber unit can produce a product hydrogen stream. The pressure of the product hydrogen stream can typically be similar to, but usually slightly lower than, the input pressure. The pressure of the product hydrogen stream can differ from the pressure of the input stream by about 50 psi (about 350 kPa) or less, for example about 30 psi (about 210 kPa) or less, about 10 psi (about 69 kPa) or less, or about 5 psi (about 35 kPa) or less. Additionally or alternately, the pressure of the hydrogen product stream can be at least about 90% of the input pressure, for example at least about 95%, at least about 98%, or at least about 99%. The hydrogen content (or purity) of the product hydrogen stream can be at least about 90% by volume (e.g., at least about 90.0% by volume), for example at least about 99.0% by volume, at least about 99.1% by volume, at least about 99.3% by volume, or at least about 99.5% by volume. Relative to the input stream, the hydrogen product stream can include at least about 80% by volume of the hydrogen from the input stream, for example at least about 85% by volume or at least about 90% by volume. Note that this amount of hydrogen recovery by a cycling adsorber unit is used to represent the net amount of hydrogen recovered, after accounting for losses of hydrogen due to the need for depressurization, purge, and pressurization portions of the cycle. Conventionally, the hydrogen for these portions of the cycle is taken from the hydrogen produced by the cycling adsorber, thus reducing the amount of hydrogen recovery.

A cycling adsorber unit can also produce a tail gas stream. The tail gas stream can include the reduced pressure flows produced during the portions of the cycle that regenerate the adsorbent. The pressure of the tail gas stream can be similar to the pressure of the purge stream. The pressure of the tail gas stream can be about 125 psig (about 860 kPag) or less, for example about 100 psig (about 690 kPag) or less, about 75 psig (about 520 kPag) or less, about 60 psig (about 410 kPag) or less, or about 45 psig (about 310 kPag) or less.

Generation of Multiple Tail Gas Streams

The output gas from a reforming reaction can include $H_2$, CO, $CO_2$, and the hydrocarbon used as the reactant for reforming. In the following example, although $CH_4$ may be referred to herein as the reactant, it should be understood that any other convenient type of hydrocarbon can be used (as well as mixtures thereof, including methane or not), including molecules containing nitrogen, oxygen, or other heteroatoms. The output from the reforming reaction can optionally be passed through a water gas shift reaction, in order to modify the relative amounts of $H_2$, CO, and $CO_2$ in the product. In order to increase the purity of the hydrogen in the output gas (or the output from a water gas shift reaction), the output gas can be passed through a cycling adsorber unit. The cycling adsorber unit can, in one embodiment, adsorb CO, $CO_2$, and $CH_4$ from stream, leaving behind a higher purity hydrogen stream.

In typical operation of a cycling adsorber unit, the individual adsorber units can undergo a periodic regeneration to release the adsorbed contaminants. Typically, a single tail gas stream of the adsorbed contaminants (such CO, $CO_2$, and $CH_4$) can be generated during a regeneration phase for an adsorbent bed. In various embodiments, a cycling adsorber unit can be operated to generate multiple tail gas streams during regeneration of a bed. This can allow for generation of tail gas streams with different compositions. The multiple streams can be generated by reducing the pressure in an adsorbent bed in stages.

As an example, a cycling adsorber unit can include multiple types of adsorbents within a chamber. These multiple types of adsorbents can be arranged, for example, as axially concentric (cylindrical and/or annular) layers within a cylindrical chamber. In one example, an adsorbent layer closest to and/or containing the central axis of the chamber can include a zeolite material. Some zeolites can be effective for adsorption of CO and $CO_2$ during adsorption of impurities from an $H_2$ stream. Depending on the embodiment, a zeolite may be selective for adsorption of CO and/or $CO_2$ relative to $CH_4$. Additionally or alternatively, the increased proportion of CO and/or $CO_2$ in the output gas may lead to an increase in the amount of CO and/or $CO_2$ adsorbed in the zeolite relative to $CH_4$. Alternately, the adsorbent layer closest to the central axis of the chamber can be formed from a material selective for adsorption of carbon oxides relative to hydrocarbons, or at least a material sufficiently non-selective to allow a majority of the adsorption sites in the material to adsorb a carbon oxide under the hydrogen separation conditions in a swing adsorber unit. Alternate suitable materials for the adsorbent layer closest to the central axis can include porous alumina and/or functionalized surfaces that include an amine functionality, such as a functionalized silica gel. In an adsorber unit, a second layer surrounding the zeolite layer can be composed of activated carbon, a second type of zeolite, and/or another material suitable for adsorption of $CH_4$ (or other hydrocarbons). The CO and/or $CO_2$ can be preferentially adsorbed by the zeolite layer, so that the composition reaching the second activated carbon layer can be enriched in $CH_4$. In an alternative embodiment, adsorbent layers can be arranged so that the first adsorbent layer is composed of activated carbon, silica gel, and/or another material.

After the hydrogen purification portion of a reaction cycle, the bed in a cycling adsorber unit can be regenerated for further use. The regeneration of the bed can occur in more than one stage. In a first stage, the pressure in the unit can be reduced to an intermediate pressure, such as a pressure of about 50 psig (about 0.3 MPag) to about 125 psig (about 0.9 MPag). At the intermediate pressure, the CO and/or $CO_2$ can be selectively desorbed from the zeolite adsorbent, e.g., while the majority of the $CH_4$ remains adsorbed to the activated carbon. This can be due, for example, to a lower binding strength of the CO and/or $CO_2$ to the zeolite as compared to a binding strength of the methane to the activated carbon. A purge stream can be introduced during the first desorption stage to produce a first tail gas with an increased concentration of CO and/or $CO_2$. After a period of time, the pressure can be further reduced, while a second purge stream is introduced to desorb the remaining contaminants in the adsorbing unit. Because a portion of the CO and/or $CO_2$ has already been desorbed and removed from the adsorbing unit, the second tail gas can have an increased concentration of $CH_4$. The first and second purge streams can have the same composition, or different purge streams may be used.

As an example of possible operating conditions, during a hydrogen capture cycle, a cycling adsorber unit can be operated at a pressure of at least about 250 psig (about 1.7 MPag). This can result in adsorption of CO, $CO_2$, and/or $CH_4$ (and optionally other hydrocarbons) on the adsorbent(s) present in the unit. At the start of the regeneration cycle, the pressure can initially be dropped to an intermediate value, such as about 125 psig (about 0.9 MPag) or less, for example about 100 psig (about 0.7 MPag) or less, or about 75 psig (about 0.5 MPag) or less, but typically at least about 50 psig (about 350 kPag). At the intermediate pressure value, all or some of the CO and/or $CO_2$ and the methane (or other hydrocarbon) can be desorbed. However, the less strongly bound CO and/or $CO_2$ can be preferentially desorbed, leading to a tail gas with a larger amount of CO and/or $CO_2$ and a smaller amount of $CH_4$. After a period of time, the pressure for the regeneration step can be further reduced to a pressure from about 5 psig (about 35 kPag) to about 20 psig (about 140 kPag). This can result in desorption of at least a substantial portion of the remaining CO, $CO_2$, and/or $CH_4$ (and optionally other hydrocarbon) species adsorbed in the bed. Due to depletion of CO and $CO_2$ during the intermediate pressure portion of the purge, this lower pressure portion of the purge can result in a tail gas enriched in $CH_4$.

The tail gases generated from the intermediate pressure purge and the low pressure purge can be diverted for use in different functions. For example, the tail gas from the intermediate pressure purge can be sent to the $CO_2$ absorption unit for recovery of additional $CO_2$. The tail gas from the low pressure purge can be used as fuel for the hydrocarbon reforming unit.

In various embodiments, the total tail gas for the cycling adsorption unit can be divided between multiple tail gases in any convenient manner. One option can be to have multiple tail gases, where each tail gas has roughly a comparable amount of the total tail gas. For example, in an embodiment involving two tail gases, the first tail gas can include at least about 30% of the total tail gas volume, for example at least about 40% or at least about 45%. Additionally or alternately with regard to the multiple tail gas option, the first tail gas can include about 70% or less of the total tail gas volume, for example about 60% or less or about 55% or less.

In another embodiment, the volume of gas in multiple tail gases can be selected to produce tail gases having a desired composition. For example, it can be desirable to create a portion of tail gas enriched in methane (or another fuel hydrocarbon) while having a relatively low concentration of $CO_2$. Such a tail gas portion can be recycled as a fuel gas input, for example, for the steam reforming reaction. In this type of embodiment, it can be desirable to conduct a longer desorption at intermediate pressure to remove more $CO_2$ prior to the second desorption stage. In another type of example, the output from reforming may have a lower hydrogen content, such as from about 50 vol % to about 75 vol %, and a corresponding higher $CO_2$ content. In such an example, it can be beneficial to have a first tail gas that represents a larger proportion of the total tail gas. Thus, in an embodiment, the first tail gas can include at least about 70% of the total tail gas volume, for example at least about 75%, at least about 80%, or at least about 85%. Additionally or alternately, the first tail gas can include about 95% or less of the total tail gas volume, for example about 90% or less, about 85% or less, or about 80% or less.

The first tail gas can have a first combined content of CO plus $CO_2$ of at least about 40% by volume on a dry basis, for example at least about 50% by volume or at least about 60% by volume. Additionally or alternatively, the first tail gas can have a first hydrocarbon content of about 15% by volume or less, for example about 10% by volume or less or about 5% by volume or less. Further additionally or alternately, the second tail gas can have a second combined content of CO plus $CO_2$ of about 20% by volume or less, for example about 10% by volume or less or about 5% by volume or less. Still further additionally or alternately, the second tail gas can have a second hydrocarbon content of at least about 30% by volume, for example at least about 40% by volume, at least about 50% by volume, or at least about 60% by volume.

Integration of $CO_2$ Recovery and Cycling Adsorber Units

In various embodiments, recovery of both $CO_2$ and $H_2$ can be improved by subjecting only a portion of the reforming output to $CO_2$ recovery prior to introducing the reforming output into an adsorber unit for hydrogen recovery. Many conventional hydrogen generation systems include only one type of recovery unit, such as only a cycling adsorber unit or only an amine unit for $CO_2$ extraction. Such conventional systems can produce an output stream enriched in $CO_2$ and an output stream enriched in $H_2$. However, the purity and/or the amount of the desired output molecule captured in one or both of the output streams can be reduced.

One alternative for improving the quality of the $H_2$ and $CO_2$ output streams could involve use of both a cycling adsorber unit and an amine unit in a serial configuration. The output from a reforming unit (and/or a water gas shift reactor) can be passed first into a cycling adsorber unit and then an amine unit, or vice versa. Again, this type of conventional configuration can generate both an $H_2$ output stream and a $CO_2$ output stream. A difficulty with the serial configuration can be that the effectiveness of the two units can be dependent on which unit occurs first in the series.

In an embodiment, a high purity output stream containing both $CO_2$ and $H_2$ can be generated by using both an amine unit and a cycling adsorber unit while avoiding a pure serial configuration. For example, the output from a reforming unit (and/or output from a subsequent water gas shift reactor) can be divided into two portions. In this discussion, the term "dividing" is used herein to indicate that two (or more) output portions are formed from the output of the reforming unit. In some embodiments, the output portions can have approximately the same composition and/or can have compositions that are not substantially different. The equipment for dividing the output into two portions can be a pipe or conduit that feeds into a junction with two output flows, such as a tee-junction, or any other convenient configuration for forming two output portions can be used. In various embodiments, the equipment configuration can include a valve or another feature that can allow for control over the amount of the reforming output divided into the first portion versus the second portion.

A first portion of the reforming unit output can be passed into an amine unit for $CO_2$ removal. This can generate a $CO_2$ enriched output stream and a stream containing a reduced amount of $CO_2$. The stream with the reduced amount of $CO_2$ can then be combined with the remaining portion of the reforming unit output and passed into the cycling adsorber unit. By removing $CO_2$ from a portion of the stream, the input to the cycling adsorber unit can be correspondingly enriched in $H_2$. This can lead to an increase in the purity of hydrogen and/or the amount of high purity hydrogen in the output stream from the cycling adsorber unit. This can be due, at least in part, to the reduced amount of contaminants (e.g., $CO_2$) in the input to the cycling adsorber unit.

In an embodiment involving staged output of tail gases from adsorber units, an increase in the amount of recovery of hydrogen and the amount of recovery of $CO_2$ can be achieved. As described above, a portion of the output from a hydrocarbon reforming unit can be passed to an amine unit. After $CO_2$ removal, the $CO_2$ depleted stream from the amine unit and the remaining portion of the output from the hydrocarbon reforming unit can be passed into the cycling adsorber unit. The cycling adsorber unit can be operated to generate at least two types of tail gas. The first tail gas can be enriched in a combined content of CO plus $CO_2$, while the second tail gas can be enriched in $CH_4$ (or other hydrocarbons used as feed for the reforming reaction). The tail gas enriched in CO plus $CO_2$ can then be used as an additional input to the amine unit, allowing for an increase in the amount and/or purity of $CO_2$ recovered from the overall process.

In some embodiments, the output from a reforming unit and/or water gas shift reaction can be used as an input stream for both an amine unit (or other $CO_2$ recovery process) and a hydrogen purification process. The input stream can be divided into at least two portions. The portion of the input stream delivered to the amine unit can be referred to as a first input portion, while the portion of the input stream delivered to the hydrogen purification process (such as a cycling adsorber unit) can be referred to as a second input portion. In such embodiments, the first input portion can correspond to at least about 5 vol % of the input stream, for example at least about 10 vol % of the input stream or at least about 20 vol % of the input stream. Additionally or alternatively, the first input portion can correspond to about 70 vol % or less of the input stream, for example about 60 vol % or less, about 50 vol % or less, about 40 vol % or less, or about 30 vol % or less. In various embodiments, the second input portion can comprise the balance of the volume of the input stream.

Hydrogen Generation using a Biocomponent Hydrocarbon Feed

In some embodiments, the overall performance of a hydrogen generation system can be improved when a biocomponent source is selected as the feed for the reforming reaction. Use of a biocomponent feed within a refinery setting can involve some pre-processing to convert the biocomponent feed to a feed suitable for use in conventional refinery equipment. One option for pre-processing a biocomponent feed can be to hydrotreat the feed to remove heteroatoms such as oxygen. Due to the presence of oxygen, hydrotreatment of a biocomponent feed is typically an exothermic process.

In an embodiment, the excess heat from hydrotreatment of a biocomponent feed can be used to provide heat for reforming, which is typically an endothermic process. A biocomponent feed such as a fatty acid alkyl ester can be used as at least a portion of a hydrocarbon feed for reforming. Prior to passing the biocomponent feed into the reformer, the feed can be pre-processed in a hydrotreatment reaction. This can result in conversion of fatty acid alkyl ester(s) into hydrocarbons, carbon oxides, and/or water. For example, a fatty acid methyl ester with an empirical formula of $C_{17}H_{34}O_2$ can be converted into one or more of an alkane (such as a $C_{16}$ alkane and/or methane), carbon monoxide, carbon dioxide, and water. Depending on the reaction conditions, both a methane and a longer chain alkane may be formed during hydrotreatment. The entire effluent from hydrotreatment can be used as a feed to a reforming reaction, or an intermediate separation can be used to remove a portion of the effluent prior to use as a feed for reforming. A heat exchanger can be used to draw heat from the exothermic hydrotreatment process for heating input streams to the reforming reaction. This can reduce the amount of fuel combusted to maintain the temperature in the hydrocarbon reforming reactor.

Additionally or alternatively, a deoxygenated biocomponent feed can be supplemented with another hydrocarbon stream, such as a methane feed. For example, from about 10 vol % to about 90 vol % of methane can be added to the deoxygenated biocomponent feed prior to entering the reforming unit; in such an embodiment, typically at least about 10 vol % of the other hydrocarbon stream can generally be added, for example at least about 25 vol % or at least about 50 vol %, and typically about 90 vol % or less of the other hydrocarbon stream can generally be added, for example about 75 vol % or less or about 50 vol % or less. Prior to contacting the reforming catalyst, the added methane (or other hydrocarbon) stream can be heated by absorbing heat from the exothermic hydrotreatment of the biocomponent feed. The added methane (or other hydrocarbon) stream can additionally or alternately be combined with the deoxygenated biocomponent feed before or after entering the reforming unit.

Other Types of Cycling Adsorber Units

Other types of cycling adsorber units can be used instead of (or alternately in addition to) a pressure swing adsorber. For example, a temperature swing adsorber unit can operate in a manner similar to a pressure swing unit. Instead of using pressure as the primary driver for sorption and desorption of contaminants, a temperature swing adsorption (TSA) process can use temperature as the primary variable for controlling contaminant sorption and desorption. It is noted that pressure changes can also be used in a TSA unit to further control contaminant removal, and similarly temperature changes can be used in a PSA unit.

Another option for the cycling adsorber unit is to use a rapid cycle pressure swing adsorber. A conventional pressure swing adsorption unit generally has cycle times on the order of at least several minutes. This is due in part to the amount of time required to allow diffusion of the components through the beds utilized in conventional PSA, as well as the equipment configuration and valving involved. An alternative to a conventional PSA process is rapid cycle pressure swing adsorption (RCPSA). An RCPSA unit can have total cycle times of one minute or less, for example 30 seconds or less, 15 seconds or less, 10 seconds or less, 5 seconds or less, 4 seconds or less, 3 seconds or less, or 2 seconds or less.

In some embodiments, an RCPSA unit can make use of substantially different sorbents, such as, but not limited to, structured materials such as monoliths. Conventional PSA can tend to rely on particulate adsorbents, which may additionally or alternately be useful in RCPSA as well, depending on the nature of the particulate adsorbent. Due to construction constraints, a conventional PSA unit is usually comprised of 2 or more separate beds that cycle, so that at least one or more beds can fully (or at least partially) be in the feed portion of the cycle at any one time, in order to limit disruptions or surges in the treated process flow. However, due to the relatively large size of conventional PSA equipment, the particle size of the adsorbent material is typically limited to particle sizes (e.g., equivalent spherical diameter) of about 1 mm and above.

An RCPSA unit can utilize a rotary valving system to conduct the gas flow through a rotary sorber module or a non-rotary sorber module. In embodiments involving a rotary sorber module, the rotary sorber module can contain a number of separate compartments, each of which can be successively cycled through the sorption and desorption steps as the rotary module completes the cycle of operations. In certain embodiments, the rotary sorber module can be composed of tubes held between two seal plates on either end of the rotary sorber module. The seal plates can be in contact with a stator comprised of separate manifolds, in which the inlet gas can be conducted to the RCPSA tubes and in which processed purified product gas and the tail gas exiting the RCPSA tubes can be conducted away from rotary sorber module. By suitable arrangement of the seal plates and manifolds, a number of individual compartments may be passing through the characteristic steps of the complete cycle at any one time. In contrast with conventional PSA, the flow and pressure variations required for the RCPSA sorption/desorption cycle may be changed in a number of separate increments on the order of seconds or portions of seconds per cycle, which can smooth out the pressure and flow rate pulsations encountered by the compression and valving machinery. In this form, the RCPSA module can include valving elements angularly spaced around the circular path taken by the rotating sorption module, so that each compartment can be successively passed to a gas flow path in the appropriate direction and pressure to achieve one of the incremental pressure/flow direction steps in the complete RCPSA cycle. A non-rotary or non-moving sorber module can also contain a number of separate compartments. Each of the separate compartments can be successively cycled through adsorption and desorption (as well as purge) steps. Each of the separate compartments can be in fluid communication with a fixed port providing gas in a cyclic manner as part of a rotary valving apparatus, similar to the rotary embodiment described above. A non-rotary or non-moving sorber module can be beneficial as the mass of the sorbent bed increases.

One advantage of RCPSA technology includes the potential for more efficient use of adsorbent material. In some embodiments, the quantity of adsorbent required with RCPSA technology can be only a fraction of that required for conventional PSA technology to achieve the same separation quantities and qualities. Thus, the footprint, investment, and/or amount of active adsorbent required for RCPSA can be significantly lower than for a conventional PSA unit processing an equivalent amount of gas.

In an embodiment, RCPSA bed length unit pressure drops, required adsorption activities, and/or mechanical constraints (e.g., due to centrifugal acceleration of the rotating beds in RCPSA) may inhibit and/or prevent the use of many conventional PSA adsorbent bed materials. In particular, adsorbents that are in a loose pelletized, particulate, beaded, or extrudate form may not be usable in an RCPSA bed. In a preferred embodiment, adsorbent materials can be secured to a supporting understructure material for use in an RCPSA rotary apparatus. For example, one embodiment of the rotary RCPSA apparatus can be in the form of sheets comprising adsorbent material coupled to a structured reinforcement material. A suitable binder may be used to attach the adsorbent material to the reinforcement material. Non-limiting examples of reinforcement material can include monoliths, mineral fiber matrices (such as glass fiber matrices), metal wire matrices (such as wire mesh screens), metal foil (such as aluminum foil), which can be anodized, and the like, and combinations thereof. Examples of glass fiber matrices can include woven and non-woven glass fiber scrims. The adsorbent sheets can be made, e.g., by coating a slurry of suitable adsorbent component(s), such as zeolite crystals with binder constituents onto the reinforcement material, such as nonwoven fiber glass scrims, woven metal fabrics, and expanded aluminum foils. In a particular embodiment, adsorbent sheets or material can be coated onto a ceramic support.

An adsorber in a RCPSA unit typically comprises an adsorbent solid phase formed from one or more adsorbent materials and a permeable phase (empty space or gas phase) through which the gases to be separated can flow from the inlet to the outlet of the adsorber, the components to be removed typically being fixed on the solid phase as the gases pass through the permeable phase. This permeable phase can also/alternately be called "circulating gas phase" or "gas phase". The solid phase can advantageously include a network of pores, the mean size (diameter) of which can usually be between about 0.02 µm and about 20 µm. There may be a network of even smaller pores, termed "micropores", this being encountered, for example, in microporous carbon adsorbents and/or zeolites. The phenomenon of adsorption comprises two main steps, namely passage of the adsorbate through the circulating gas phase and onto the surface of the solid phase, followed by passage (diffusion) of the adsorbate from the surface to the volume of the solid phase into the adsorptive material.

In an embodiment, RCPSA can utilize a structured adsorbent incorporated into tubes in the RCPSA apparatus. Such a structured adsorbent can have an unexpectedly high mass transfer rate, since the gas flow can be through the channels formed by the structured sheets of the adsorbent, which can offer a significant improvement in mass transfer, as compared to a traditional packed fixed bed arrangement as utilized in conventional PSA. The ratio between the transfer rate of the gas phase ($\tau_g$) and the mass transfer rate of the solid phase ($\tau_s$) in the current invention can be greater than 10, for example greater than 25 or greater than 50.

The structured adsorbent embodiment can also result in significantly greater pressure drops to be achieved through the adsorbent than in conventional PSA, preferably without the detrimental effects typically associated with particulate bed technology. The adsorbent beds can be designed with adsorbent bed unit length pressure drops of greater than 5 inches of water per foot of bed length (4 kPa/m), for example greater than 10 in. $H_2O$/ft (8 kPa/m) or greater than 20 in. $H_2O$/ft (16 kPa/m). This is in contrast with conventional PSA units, where the adsorbent bed unit length pressure drops are generally limited to below about 5 in. $H_2O$/ft (4 kPa/m), depending upon the adsorbent used, with most conventional PSA units being designed with a pressure drop of about 1 in. $H_2O$/ft (0.8 kPa/m) or less, e.g., to minimize the problems associated with the larger beds, longer cycle times, and particulate absorbents of conventional PSA units. The adsorbent beds of conventional PSA generally cannot accommodate higher pressure drops, because of the risk of fluidizing the beds, which can result in excessive attrition and premature unit shutdowns due to accompanying equipment problems and/or a need to add/replace lost adsorbent materials. These markedly higher adsorbent bed unit length pressure drops can allow RCPSA adsorbent beds to be significantly more compact, shorter, and more efficient than conventional PSA.

The achievement and accommodation of the high unit length pressure drops of the current embodiment can allow relatively high vapor velocities to be achieved across the structured adsorbent beds. This can result in a greater mass contact rate between the process fluids and the adsorbent materials per unit of time than can be achieved by conventional PSA. This can additionally or alternately result in shorter bed lengths, higher gas phase transfer rates ($\tau_g$), and ultimately improved hydrogen recovery. With significantly shorter bed lengths, total pressure drops of the RSCPA application can be maintained at total bed pressure differentials during the feed cycle from about 10 psig (about 70 kPag) to about 50 psig (about 350 kPag), preferably less than about 30 psig (about 210 kPag), while minimizing the active adsorbent beds to less than about 5 feet (about 1.5 m) in length, for example less than about 2 feet (about 0.6 m) in length or less than about 1 foot (about 0.3 m) in length.

The absolute pressure levels employed during the RCPSA process are not necessarily critical, provided that the pressure differential between the adsorption and desorption steps is sufficient to cause a change in the adsorbate fraction loading on the adsorbent, thereby providing an incremental loading improvement (delta loading) effective for separating the stream components processed by the RCPSA unit. Typical pressure levels can range from about 50 psia (about 350 kPaa) to about 2000 psia (about 13.8 MPaa), for example from about 80 psia (about 560 kPaa) to about 500 psia (about 3.5 MPaa) during the adsorption step. However, it should be noted that the actual pressures utilized during the feed, depressurization, purge and repressurization stages can be highly dependent upon many factors including, but not limited to, the actual operating pressure and temperature of the overall stream to be separated, stream composition, and desired recovery percentage and purity of the RCPSA product stream.

Additional Embodiments

Embodiment 1

A method for recovery of hydrogen and carbon dioxide in a refinery, comprising: dividing an input stream containing hydrogen, carbon dioxide, and a hydrocarbon into a first input portion and a second input portion, the input stream comprising an effluent from a reforming unit, the input stream exhibiting a hydrogen content of at least about 70 vol % and a $CO_2$ content of at least about 5 vol %, the first input portion comprising from about 5 vol % to about 60 vol % of the input stream; combining the first input portion and a first tail gas stream, the combined first input portion and first tail gas stream exhibiting a $CO_2$ content of less than about 70 vol %; separating the first input portion and a first tail gas stream to form a $CO_2$ recovery stream and a hydrogen enriched stream, the $CO_2$ recovery stream having a $CO_2$ content of at least about 70 vol %, the $CO_2$ recovery stream containing at least about 80% of the $CO_2$ in the combined first input portion and first tail gas stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 90 vol %, the hydrogen product stream containing at least about 85% of the hydrogen in the input stream; contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 60 vol % on a dry basis and a first hydrocarbon content of about 10 vol % or less on a dry basis; contacting the adsorbent with a second regeneration stream at a second pressure of about 5 psig (about 35 kPag) to about 20 psig (about 140 kPag) to form a second tail gas stream, the second tail gas stream containing a second combined content of CO plus $CO_2$ of about 10 vol % or less on a dry basis and a second hydrocarbon content of at least about 40 vol % on a dry basis, the second tail gas stream comprising from about 25% to about 60% of a combined volume of the first and second tail gas streams; and introducing the second tail gas stream as an input to the reforming unit.

Embodiment 2

The method of embodiment 1, wherein the $CO_2$ recovery stream contains at least about 70% of the $CO_2$ in the input stream.

Embodiment 3

A method for recovery of hydrogen and carbon dioxide in a refinery, comprising: dividing an input stream containing hydrogen, carbon dioxide, and a hydrocarbon into a first input portion and a second input portion, the input stream comprising an effluent from a reforming unit, the input stream exhibiting a hydrogen content from about 40 vol % to about 70 vol % and a $CO_2$ content of at least about 25 vol %, the first input portion comprising from about 5 vol % to about 60 vol % of the input stream; combining the first input portion and a first tail gas stream, the combined first input portion and first tail gas stream having a $CO_2$ content of less than about 70 vol %; separating the first input portion and a first tail gas stream to form a $CO_2$ recovery stream and a hydrogen enriched stream, the $CO_2$ recovery stream having a $CO_2$ content of at least about 70 vol %, the $CO_2$ recovery stream containing at least about 80% of the $CO_2$ in the combined first input portion and first tail gas stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 90 vol %, the hydrogen product stream containing at least about 85% of the hydrogen in the input stream; contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50 vol % on a dry basis and a first hydrocarbon content of about 10 vol % or less on a dry basis; contacting the adsorbent with a second regeneration stream at a second pressure from about 5 psig (about 35 kPag) to about 20 psig (about 140 kPag) to form a second tail gas stream, the second tail gas stream containing a second combined content of CO plus $CO_2$ of about 10 vol % or less on a dry basis and a second hydrocarbon content of at least about 50 vol % on a dry basis, the second tail gas stream comprising from about 5% to about 25% of a combined volume of the first and second tail gas streams; and introducing the second tail gas stream as an input to the reforming unit.

Embodiment 4

The method of embodiment 3, wherein the $CO_2$ recovery stream contains at least about 50% of the $CO_2$ in the input stream.

Embodiment 5

The method of any one of the previous embodiments, wherein the second tail gas stream has a hydrocarbon content of at least about 60 vol %.

Embodiment 6

The method of any one of the previous embodiments, wherein contacting the adsorbent with either or both of the regeneration streams comprises flowing the regeneration stream(s) in a counter-current direction relative to a flow direction of the hydrogen enriched stream.

Embodiment 7

The method of any one of the previous embodiments, wherein the stream containing hydrogen, carbon dioxide, and a hydrocarbon comprises methane, an alkane, a hydrocarbon based on a biocomponent source, a hydrocarbon derived from deoxygenation of a fatty acid alkyl ester, or a combination thereof.

Embodiment 8

The method of any one of the previous embodiments, wherein the output from the reforming unit is contacted with a water gas shift catalyst under effective conditions for increasing the amount of hydrogen in the reforming effluent prior to division into a first input stream and a second input stream.

Embodiment 9

The method of any one of the previous embodiments, wherein the second tail gas stream is introduced as a fuel input into the reforming unit.

Embodiment 10

The method of any one of the previous embodiments, wherein the hydrogen product stream has a hydrogen content of at least about 90% of the hydrogen content of the input stream.

Embodiment 11

A method for recovery of hydrogen and carbon dioxide in a refinery, comprising: exposing a feed including at least a biocomponent portion to a hydroprocessing catalyst under effective conditions to produce a deoxygenated biocomponent input stream, said exposing being an exothermic reaction that generates heat; reforming the deoxygenated biocomponent input stream to form an effluent containing hydrogen, carbon dioxide, and a hydrocarbon, the reforming comprising contacting the deoxygenated biocomponent input stream with a first stream containing water vapor in the presence of a reforming catalyst; contacting the reforming effluent with a water gas shift catalyst in the presence of a second stream containing water vapor under effective conditions to form a shifted reforming effluent, containing a hydrogen content of about 70 vol % and a $CO_2$ content of at least about 5 vol %; absorbing at least a portion of the heat generated by said exposing, the heat being absorbed by at least one of the first stream containing water vapor, the second stream containing water vapor, or an input stream to said reforming; dividing the reforming effluent into a first input portion and a second input portion, the first input portion comprising from about 5 vol % to about 60 vol % of the reforming effluent; treating the first input portion with an amine under effective conditions for separation of $CO_2$ to form a $CO_2$ recovery stream having a $CO_2$ content of at least about 70 vol % and a hydrogen enriched stream; and exposing the hydrogen enriched stream and the second input portion to an adsorbent in a cycling adsorber unit at a pressure of at least about 500 psig (about 3.4 MPag) to produce a hydrogen product stream having a hydrogen content of at least about 99.0 vol % and a pressure of at least about 90% of the pressure of the input stream.

Embodiment 12

The method of embodiment 11, further comprising: contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50 vol % on a dry basis and a first hydrocarbon content of about 10 vol % or less on a dry basis; contacting the adsorbent with a second regeneration stream at a second pressure of about 5 psig (about 35 kPag) to about 20 psig (about 140 kPag) to form a second tail gas stream, the second tail gas stream containing a second combined content of CO plus $CO_2$ of about 10 vol % or less on a dry basis and a second hydrocarbon content of at least about 50 vol % on a dry basis, the second tail gas stream comprising from about 5% to about 25% of a combined volume of the first and second tail gas streams; and introducing the second tail gas stream as an input to the reforming unit.

Embodiment 13

The method of embodiment 12, wherein treating the first input portion with the amine comprises separating the first input portion and the first tail gas stream to form the $CO_2$ recovery stream and the hydrogen enriched stream, the $CO_2$ recovery stream containing at least about 80% of the $CO_2$ in the combined first input portion and first tail gas stream.

Embodiment 14

The method of embodiment 12 or embodiment 13, wherein contacting the reforming effluent with a water gas shift catalyst comprises: adding a methane stream to the reforming effluent; and contacting the reforming effluent and the added methane stream with the water gas shift catalyst, wherein the at least a portion of the heat generated by said exposing is absorbed by the added methane stream prior to contacting the water gas shift catalyst.

Embodiment 15

The method of any one of the previous embodiments, wherein the cycling adsorber unit comprises a plurality of adsorbent beds, at least one of the plurality of beds being in a pressurization, depressurization, or purge portion of a cycle when at least one other bed is being exposed to the hydrogen enriched stream and the second input portion.

Embodiment 16

A method for recovery of hydrogen and carbon dioxide in a refinery, comprising: dividing an input stream containing hydrogen, carbon dioxide, and a hydrocarbon into a first input portion and a second input portion, the input stream comprising an effluent from a reforming unit, the input stream having a hydrogen content of at least about 40 vol % of hydrogen and containing at least about 5 vol % $CO_2$, the first input portion comprising from about 5 vol % to about 60 vol % of the input stream; combining the first input portion and a first tail gas stream, the combined first input portion and first tail gas stream having a $CO_2$ content of less than about 70 vol %; separating the first input portion and a first tail gas stream to form a $CO_2$ recovery stream and a hydrogen enriched stream, the $CO_2$ recovery stream having a $CO_2$ content of at least about 70 vol %, the $CO_2$ recovery stream containing at least about 80% of the $CO_2$ in the combined first input portion and first tail gas stream; exposing the hydrogen enriched stream and the second input portion to an adsorbent in a cycling adsorber unit at a pressure of at least about 500 psig (about 3.4 MPag) to produce a hydrogen product stream having a hydrogen content of at least about 90 vol %, the hydrogen product stream containing at least about 85% of the hydrogen in the input stream; contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50 vol % on a dry basis and a first hydrocarbon content of about 10 vol % or less on a dry basis; contacting the adsorbent with a second regeneration stream at a second pressure from about 5 psig (about 35 kPag) to about 20 psig (about 140 kPag) to form a second tail gas stream, the second tail gas stream containing a second combined content of CO plus $CO_2$ of about 10 vol % or less on a dry basis and a second hydrocarbon content of at least about 40 vol % on a dry basis, the second tail gas stream comprising at least about 5% of a combined volume of the first and second tail gas streams; and introducing the second tail gas stream as an input to the reforming unit; wherein, when the input stream exhibits a hydrogen content from about 40 vol % to about 70 vol % and a $CO_2$ content of at least about 25 vol %, the second tail gas stream contains a second hydrocarbon content of at least about 50 vol % on a dry basis and the second tail gas stream comprises from about 5% to about 25% of a combined volume of the first and second tail gas streams; and wherein, when the input stream exhibits a hydrogen content of at least about 70 vol %, the first tail gas stream contains a combined content of CO plus $CO_2$ of at least about 60% by volume on a dry basis and the second tail gas stream comprises from about 25% to about 60% of a combined volume of the first and second tail gas streams.

EXAMPLES

A series of simulations were performed to determine the impact on $H_2$ and $CO_2$ recovery due to altering gas flow through an amine unit and a pressure swing adsorption (PSA) unit. FIG. 1 shows the configuration modeled in the simulations. In the configuration shown in FIG. 1, a steam methane reforming unit 110 can be used to reform hydrocarbons from a hydrocarbon input stream 105. The hydrocarbon input stream 105 can represent any suitable hydrocarbon for reforming, such as methane and/or a biocomponent feed. If at least a portion of the hydrocarbon input is a biocomponent feed, a biocomponent input 172 can optionally be hydrodeoxygenated in a hydrotreater 170 prior to entering reforming unit 110. Optionally, but not depicted, a portion of the heat necessary for operating reforming unit 110 can be generated by capturing heat from hydrotreater 170 via heat exchange. Air and steam for the reforming reaction can also be fed into the reforming unit 110. In FIG. 1, a single input 107 is shown for addition of air and steam, but separate inputs can alternately be used. Reforming unit 110 can generate reformed output 115 and a flue gas 117. The flue gas 117 can include carbon oxides and water. The reformed output 115 can include an increased amount of hydrogen relative to the hydrocarbon input 105. Reformed output 115 can then pass into an optional water gas shift unit 120. The water gas shift unit 120 can increase the amount of hydrogen in the reformed output by using the water gas shift reaction to convert $H_2O$ and CO into $H_2$ and $CO_2$. Although not pictured in FIG. 1, it may be desirable for steam to be added to the water gas shift unit 120 to facilitate the reaction. The water gas shift output 125 from the water gas shift unit can be a stream containing hydrogen as well as carbon oxides. A portion of the water gas shift output 125 from the water gas shift reactor 120 can be processed in an amine unit 130 for recovery of $CO_2$. Amine unit 130 can generate an output 132 containing an increased amount of $CO_2$ and a corresponding output 127 that is enriched in $H_2$. The amine unit output 132 can correspond to a $CO_2$ recovery stream. The amine unit output 127 enriched in $H_2$ can be combined with a remaining portion of amine unit output 125 for use as a feed into PSA unit 140. PSA unit can generate a hydrogen output 145 with a relatively high purity level, such as a purity of at least about 99% hydrogen by volume. PSA unit can also generate a tail gas 147 that includes carbon oxides.

In the series of simulations, the amount of water gas shift output 125 initially sent to the amine unit versus the PSA unit was varied to calculate the impact on $H_2$ and $CO_2$ recovery. Table 1 provides first example with water gas shift output 125 having a hydrogen content of about 80% or greater. Table 1 shows the relative amounts of $H_2$ captured as the amount of water gas shift output 125 sent directly to the PSA unit is varied from 0% (meaning all of water gas shift output 125 goes first to the amine unit) to 100% (meaning all of water gas shift output 125 goes to the PSA unit).

TABLE 1

| % of stream 125 sent directly to PSA | % H$_2$ recovery in desired H$_2$ recovery stream 145 relative to stream 125 |
|---|---|
| 0% (all output initially to amine unit) | 98.84 |
| 10% | 98.93 |
| 50% | 99.25 |
| 90% | 99.47 |
| 100% (all output initially to PSA) | 99.34 |

Table 2 provides a second example of simulations of hydrogen recovery using a configuration similar to FIG. 1. For the data shown in Table 2, the amount of hydrogen in water gas shift output 125 was about 60%. As shown in Table 2, sending a portion of the water gas shift output 125 to the amine unit first for CO$_2$ recovery improved the overall hydrogen recovery in PSA hydrogen output 145. However, the maximum hydrogen recovery in PSA hydrogen output 145 was at about a 50/50 split of water gas shift output 125, as opposed to the 90/10 split shown in Table 1. Note that Table 2 shows recovery of hydrogen in relative units, rather than as a percentage of the hydrogen in water gas shift output 125. The configuration corresponding to 50% of water gas shift output 125 being sent directly to the PSA unit was selected to have a baseline value of 100 for ease of comparison. It is also noted that the lower initial hydrogen content of water gas shift output 125 resulted in larger differences in the amount of hydrogen captured in desired PSA hydrogen recovery output 145.

TABLE 2

| % of stream 125 sent directly to PSA | Relative H$_2$ recovery |
|---|---|
| 0% (all output initially to amine unit) | 92.9 |
| 10% | 96.4 |
| 50% | 100 (baseline value for comparison) |
| 90% | 98.5 |
| 100% (all output initially to PSA) | 95.4 |

Figure 2:
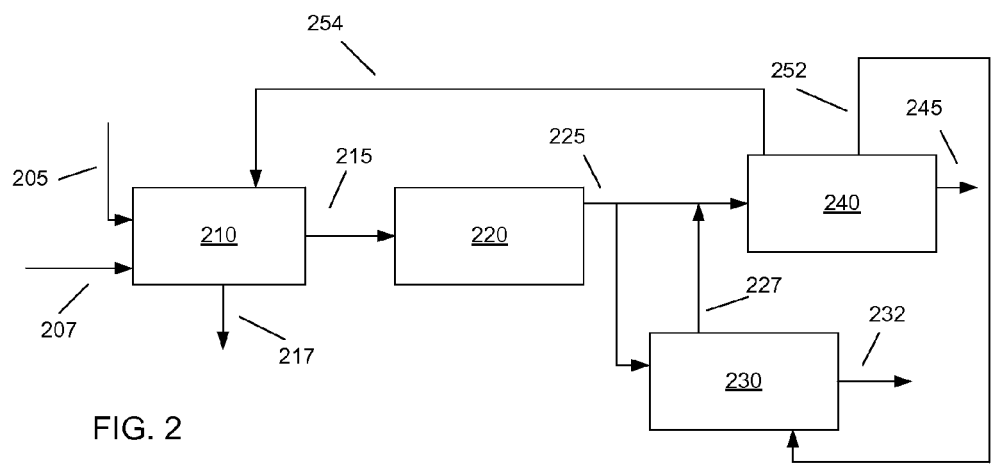
FIG. 2 schematically shows an example of a system for producing hydrogen.

FIG. 2 shows a configuration according to another embodiment of the invention suitable for converting a hydrocarbon feed to make hydrogen and carbon oxides. In FIG. 2, steam reforming unit 210 can receive a hydrocarbon feed 205 and a steam plus air feed 207 as input flows. Similarly as in FIG. 1, the single steam plus air input 207 can alternately be employed as separate inputs. A tail gas 254 from PSA unit 240 can provide a third input. Again, if desired, some or all of the (four) inputs (three labeled input streams) into steam reforming unit 210 may be combined outside the unit, instead of being separately input. The outputs from steam reforming unit 210 can be a reformed output 215 and a flue gas 217. Reformed output 215 can then pass into optional water gas shift reactor 220 to increase the hydrogen content in water gas shift output 225. Water gas shift output 225 can then be passed into amine treatment unit 230 and/or PSA unit 240. In addition to a portion of water gas shift output 225, amine treatment unit 230 may also optionally receive a tail gas 252 from the PSA unit 240, optionally after suitable compression as may be required. Amine unit 230 can generate amine unit output 232 containing an increased amount of CO$_2$ and a corresponding amine unit output 227 that is enriched in H$_2$. The CO$_2$ enriched amine unit output 232 can correspond to a CO$_2$ recovery stream. The amine unit output 227 enriched in H$_2$ can be combined with a remaining portion of water gas shift output 225 for use as a feed into PSA unit 240. In addition to a desired hydrogen enriched PSA output 245, PSA unit 240 can also generate one or a plurality of tail gases. When a plurality of tail gases is desired, they can be generated, e.g., by reducing the pressure in PSA unit 240 in stages during a regeneration portion of a PSA cycle. In the embodiment shown in FIG. 2, the PSA unit 240 can generate two tail gases. A first tail gas 252 can be generated by reducing the pressure in the PSA unit to an intermediate level during regeneration. First tail gas 252 can be enriched in carbon oxides and can be recycled to amine unit 230, as described above. Second tail gas 254 can be enriched in hydrocarbons and can be recycled to steam reforming unit 210, as described above.

Operating a PSA unit to generate the tail gases shown in FIG. 2 can provide several advantages. For comparison, in one example, a typical input flow into a PSA unit (such as 240 in FIG. 2) for hydrogen recovery can include (on a dry basis) an H$_2$ content of about 75 vol %, a combined CO$_2$ plus CO content (which may contain CO$_2$ and/or CO) of about 15 vol %, and a CH$_4$ and/or other hydrocarbon content of about 10 vol %. In a configuration such as FIG. 1, where only one tail gas is generated, a representative composition for the PSA tail gas can include (on a dry basis) an H$_2$ content of about 30 vol %, a combined CO$_2$ plus CO content (which may contain CO$_2$ and/or CO) of about 50 vol %, and a content of about 20 vol % of CH$_4$ and/or other hydrocarbons used as input for the reforming.

Forming multiple tail gases by staging the pressure decrease during regeneration can have greater value than forming only a single tail gas. For comparison, a similar representative input can enter the PSA unit. In the configuration shown in FIG. 2, a first tail gas can be formed that contains about 60% of the total tail gas volume, with the total tail gas volume being comparable to the volume of the single tail gas. In this type of embodiment, the first tail gas can include (on a dry basis) an H$_2$ content of about 15 vol %, a combined CO$_2$ plus CO content (which may contain CO$_2$ and/or CO) of about 80 vol %, and a CH$_4$ and/or other hydrocarbon content of about 5 vol %. Relative to a single PSA tail gas configuration, the first tail gas can be enriched in carbon oxides. As noted above, this first tail gas can be used, for example, as an additional input to the amine unit for more CO$_2$ recovery. The second tail gas can have a composition including an H$_2$ content of about 53 vol %, a combined CO$_2$ plus CO content (which may contain CO$_2$ and/or CO) of about 5 vol %, and a CH$_4$ and/or other hydrocarbon content of about 42 vol %. Relative to a single PSA tail gas configuration, the second tail gas can be enriched in hydrocarbons. As noted above, this can allow the second tail gas to be suitable for use as an additional source of hydrocarbons for reforming.

As another example, the same input into the PSA unit can be used, but the tail gas can be split so that about 90% of the total tail gas volume is contained in the first tail gas. In this type of example, the first tail gas can contain an H$_2$ content of about 32 vol %, a combined CO$_2$ plus CO content (which may contain CO$_2$ and/or CO) of about 55 vol %, and a CH$_4$ and/or other hydrocarbon content of about 13 vol %. The second tail gas (having about 10% of the total tail gas volume) can contain an H$_2$ content of about 12 vol %, a combined CO$_2$ plus CO content (which may contain CO$_2$ and/or CO) of about 5 vol %, and a CH$_4$ and/or other hydrocarbon content of about 83 vol %. Compared to the example describing a 60/40 first/second tail gas split, the volume of the second tail gas for the 90/10 split is smaller, but with a greater concentration of hydrocarbons. This second tail gas can provide a more beneficial fuel gas, as less hydrogen can be lost to use as fuel and as the content of CO in the fuel gas can be reduced or minimized. Although the first tail gas in this ~90/10 split example can exhibit a lower concentration of carbon oxides, this lower concentration can be due in part to an increased concentration of hydrogen. If this first tail gas is recycled, such as to an amine unit for $CO_2$ recovery, the hydrogen in this first tail gas can eventually and advantageously return to the PSA unit, thus increasing the potential amount of hydrogen recovery in the desired hydrogen output stream.

In still another example, the input stream to the PSA unit (such as 240 in FIG. 2) can have a composition including an $H_2$ content of about 60 vol %, a combined $CO_2$ plus CO content (which may contain $CO_2$ and/or CO) of about 35 vol %, and a $CH_4$ and/or other hydrocarbon content of about 5 vol %. In a configuration where only a single tail gas is generated, the resulting tail gas can have a composition including an $H_2$ content of about 15 vol %, a combined $CO_2$ plus CO content (which may contain $CO_2$ and/or CO) of about 75 vol %, and a $CH_4$ and/or other hydrocarbon content of about 10 vol %. Alternately, a configuration similar to FIG. 2 can be used to generate two tail gases, with a first tail gas containing about 90% of the total tail gas volume. In this alternate configuration, the first tail gas can contain an $H_2$ content of about 16 vol %, a combined $CO_2$ plus CO content (which may contain $CO_2$ and/or CO) of about 81 vol %, and a $CH_4$ and/or other hydrocarbon content of about 3 vol %. The second tail gas (containing about 10% of the total tail gas volume) can contain an $H_2$ content of about 6 vol %, a combined $CO_2$ plus CO content (which may contain $CO_2$ and/or CO) of about 21 vol %, and a $CH_4$ and/or other hydrocarbon content of about 73 vol %. Although the input into the PSA unit in this still other example exhibits a higher $CO/CO_2$ concentration, dividing the tail gas in a 90/10 manner can allow for formation of a second tail gas suitable for use as a fuel gas, while reducing or minimizing the content/concentration of CO incorporated in the fuel gas.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for recovery of hydrogen and carbon dioxide in a refinery, comprising:
exposing a feed including at least a biocomponent portion to a hydroprocessing catalyst under effective conditions to produce a deoxygenated biocomponent input stream, said exposing being an exothermic reaction that generates heat;
reforming the deoxygenated biocomponent input stream to form an effluent containing hydrogen, carbon dioxide, and a hydrocarbon, the reforming comprising contacting the deoxygenated biocomponent input stream with a first stream containing water vapor in the presence of a reforming catalyst;
contacting the reforming effluent with a water gas shift catalyst in the presence of a second stream containing water vapor under effective conditions to form a shifted reforming effluent, containing a hydrogen content of about 70 vol % and a $CO_2$ content of at least about 5 vol %;
absorbing at least a portion of the heat generated by said exposing, the heat being absorbed by at least one of the first stream containing water vapor, the second stream containing water vapor, or an input stream to said reforming;
dividing the reforming effluent into a first input portion and a second input portion, the first input portion comprising from about 5 vol % to about 60 vol % of the reforming effluent;
treating the first input portion with an amine under effective conditions for separation of $CO_2$ to form a $CO_2$ recovery stream having a $CO_2$ content of at least about 70 vol % and a hydrogen enriched stream; and
exposing the hydrogen enriched stream and the second input portion to an adsorbent in a cycling adsorber unit at a pressure of at least about 500 psig (about 3.4 MPag) to produce a hydrogen product stream having a hydrogen content of at least about 99.0 vol % and a pressure of at least about 90% of the pressure of the input stream.

2. The method of claim 1, further comprising:
contacting the adsorbent with a first regeneration stream at a first pressure of about 45 psig (about 310 kPag) to about 130 psig (about 900 kPag) to form the first tail gas stream, the first tail gas stream containing a first combined content of CO plus $CO_2$ of at least about 50 vol % on a dry basis and a first hydrocarbon content of about 10 vol % or less on a dry basis;
contacting the adsorbent with a second regeneration stream at a second pressure of about 5 psig (about 35 kPag) to about 20 psig (about 140 kPag) to form a second tail gas stream, the second tail gas stream containing a second combined content of CO plus $CO_2$ of about 10 vol % or less on a dry basis and a second hydrocarbon content of at least about 50 vol % on a dry basis, the second tail gas stream comprising from about 5% to about 25% of a combined volume of the first and second tail gas streams; and
introducing the second tail gas stream as an input to the reforming unit.

3. The method of claim 2, wherein treating the first input portion with the amine comprises separating the first input portion and the first tail gas stream to form the $CO_2$ recovery stream and the hydrogen enriched stream, the $CO_2$ recovery stream containing at least about 80% of the $CO_2$ in the combined first input portion and first tail gas stream.

4. The method of claim 1, wherein reforming the deoxygenated biocomponent input stream comprises:
adding a methane stream to the deoxygenated biocomponent input stream; and
contacting the deoxygenated biocomponent input stream, the added methane stream, and the first stream containing water vapor in the presence of a reforming catalyst.

5. The method of claim 1, wherein the at least a portion of the heat generated by said exposing is absorbed by the added methane stream prior to contacting the reforming catalyst.

6. The method of claim 1, wherein the hydrogen product stream has a hydrogen content of at least about 90% of the hydrogen content of the shifted reforming effluent.

* * * * *